United States Patent
Hazard

(10) Patent No.: US 6,658,566 B1
(45) Date of Patent: Dec. 2, 2003

(54) PROCESS FOR STORAGE AND USE OF SENSITIVE INFORMATION IN A SECURITY MODULE AND THE ASSOCIATED SECURITY MODULE

(75) Inventor: Michel Hazard, Mareil/Mauldre (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/180,630

(22) PCT Filed: Mar. 12, 1998

(86) PCT No.: PCT/FR98/00503
§ 371 (c)(1),
(2), (4) Date: Dec. 11, 1998

(87) PCT Pub. No.: WO98/40853
PCT Pub. Date: Sep. 17, 1998

(30) Foreign Application Priority Data

Mar. 13, 1997 (FR) .............................................. 97 02973

(51) Int. Cl.$^7$ ................................................. H04L 9/00
(52) U.S. Cl. .......................... 713/172; 713/193; 705/66; 705/71; 380/28; 380/46; 380/282
(58) Field of Search ............................ 380/282, 44, 46, 380/28; 705/66, 71; 713/172, 193

(56) References Cited

U.S. PATENT DOCUMENTS

| 5,081,677 A | 1/1992 | Green et al. | |
|---|---|---|---|
| 5,694,472 A | * 12/1997 | Johnson et al. | ................ 380/25 |
| 6,160,890 A | * 12/2000 | Tatebayashi et al. | ........ 380/277 |
| 6,266,416 B1 | * 7/2001 | Sigbjornsen et al. | ........ 380/255 |

FOREIGN PATENT DOCUMENTS

| EP | 0002390 | 6/1979 |
|---|---|---|
| EP | 0186981 | 7/1986 |
| EP | 0440800 | 8/1991 |
| EP | 0621569 | 10/1994 |
| FR | 2681165 | 3/1993 |

* cited by examiner

Primary Examiner—Gregory Morse
Assistant Examiner—Paul E. Callahan
(74) Attorney, Agent, or Firm—Edward J. Kondracki; Lesley L. Coulson; Miles & Stockbridge P.C.

(57) ABSTRACT

The invention relates to a process for storing and using sensitive information in a security module and to a security module arranged to implement the process, and protect the sensitive information against fraudulent utilization. The sensitive information $ISj$ is stored in a form $\overline{ISj}$ encrypted using a temporary encrypting protection key $CPi$, whose content varies over time. The sensitive information $\overline{ISj}$ is decrypted before being used in a given operation, using a temporary decrypting protection key $CPid$. Before the contents of the encrypting and decrypting keys are varied, the sensitive information $\overline{ISj}$ is decrypted with the current decrypting key, and then it is re-encrypted with the new encryption key to obtain a new encrypted form, different from the previous one.

13 Claims, 5 Drawing Sheets

| TEMPORARY PROTECTION KEY | KEY NUMBER | UPDATE INDEX | KEY STORED VALUE |
|---|---|---|---|
| CP1 | N1 | $a_1$ | $CP1_{a_1}$ |
| | | $a_1+1$ | $CP1_{(a_1+1)}$ |
| ⋮ | ⋮ | ⋮ | ⋮ |
| CPi | Ni | $a_i$ | $CPi_{a_i}$ |
| | | $a_i+1$ | $CPi_{(a_i+1)}$ |
| ⋮ | ⋮ | ⋮ | ⋮ |
| CPn | Nn | $a_n$ | $CPn_{a_n}$ |
| | | $a_n+1$ | $CPn_{(a_n+1)}$ |

| REFERENCE OF SENSITIVE INFORMATION | NUMBER OF ASSOCIATED KEY | CURRENT KEY INDEX | STORED VERSION OF THE SENSITIVE INFORMATION |
|---|---|---|---|
| IS1 | N1 | a1 | $\overline{IS1}_{(a1+1)}$ |
| IS2 | N1 | a1+1 | $\overline{IS1}_{(a1+1)}$ |
| . | . | . | . |
| . | . | . | . |
| . | . | . | . |
| IS(j-1) | Ni | ai | $\overline{IS}_{(j-1)ai}$ |
| ISj | Ni | ai+1 | $\overline{ISj}_{(ai+1)}$ |
| . | . | . | . |
| . | . | . | . |
| . | . | . | . |
| ISm | Nn | an+1 | $\overline{ISm}_{(an+1)}$ |

| TEMPORARY PROTECTION KEY | KEY NUMBER | UPDATE INDEX | STORED KEY VALUE |
|---|---|---|---|
| CP1 | N1 | $a_1$ | $CP1_{a_1}$ |
|  |  | $a_1+1$ | $CP1_{(a_1+1)}$ |
| ⋮ | ⋮ | ⋮ | ⋮ |
| CPi | Ni | $a_i+2$ | $CPi_{(a_i+2)}$ |
|  |  | $a_i+1$ | $CPi_{(a_i+1)}$ |
| ⋮ | ⋮ | ⋮ | ⋮ |
| CPn | Nn | $a_n$ | $CPn_{a_n}$ |
|  |  | $a_n+1$ | $CPn_{(a_n+1)}$ |

FIG. 7

| SENSITIVE INFORMATION REFERENCE | ASSOCIATED KEY NUMBER | CURRENT KEY INDEX | STORED VERSION OF THE SENSITIVE INFORMATION | NEW KEY INDEX | NEW STORED VERSION OF THE SENSITIVE INFORMATION |
|---|---|---|---|---|---|
| IS1 | N1 | $a_1+1$ | $\overline{IS1}_{(a_1+1)}$ |  |  |
| IS2 | N1 | $a_1+1$ | $\overline{IS1}_{(a_1+1)}$ |  |  |
| ⋮ | ⋮ | ⋮ | ⋮ | ⋮ | ⋮ |
| IS(j-1) | Ni | $a_i+1$ | $\overline{IS(j-1)}_{(a_i+1)}$ | $a_i+2$ | $\overline{IS(j-1)}_{(a_i+2)}$ |
| ISj | Ni | $a_i+1$ | $\overline{ISj}_{(a_i+1)}$ | $a_i+2$ | $\overline{ISj}_{(a_i+2)}$ |
| ⋮ | ⋮ | ⋮ | ⋮ | ⋮ | ⋮ |
| ISm | Nn | $a_n+1$ | $\overline{ISm}_{(a_n+1)}$ |  |  |

FIG. 8

PROCESS FOR STORAGE AND USE OF SENSITIVE INFORMATION IN A SECURITY MODULE AND THE ASSOCIATED SECURITY MODULE

CROSS REFERENCE TO RELATED APPLICATION

The present application is related to application Ser. No. 09/125,626, filed on Aug. 21, 1998, in the names of Jerome AJDENBAUM, Patrice HAMEAU, and Anne-France PRESA, entitled "Process for Protecting a Security Module and Associated Security Module", which is assigned to the assignee of the present invention. The subject matter of said application is incorporated herein by reference.

BACKGROUND OF THE INVENTION

1. Field of the Invention

The invention relates to a process for the storage and use of sensitive information in a security module, and the associated security module.

Firstly, the term "sensitive information" is defined as any information the knowledge of which has significant repercussions on the security of the operations implemented in the security module, for example:

- cryptographic keys used in association with algorithms in operations for the encryption or decryption of a message, the authentication of a data item or a person, or the signature of a message;
- an authentication code entered by a user at a terminal cooperating with the security module (for example, the PIN or personal identification number of the terminal user).

By extension, the term "sensitive information" also designates any information deemed confidential by the person holding it, for example a bank account number, a message, or even an entire document.

The term "security module" is to be considered either in its conventional sense, in which it designates a device whose purpose, in a communication or information network, is to be held by an organization supervising the network, and to store in a protected way secret and fundamental parameters of the network such as cryptographic keys, or more simply, as designating a device allocated to various users of the network enabling each of them to have access to it, which device can also hold secret parameters. The security module can take the form of a portable device comprising a chip card, such as a bank card.

2. Description of Related Art

The invention is based on the observation that using hardware means accessible to anyone, a defrauder can observe the current consumption of the security module during the execution of a program or of instructions defined by a micro-wired logic in the security module, especially when it is based on CMOS technology. In particular, it is possible to identify the specific portions of the program that allow the reading of the information in EEPROM, particularly the sensitive information defined above.

SUMMARY OF THE INVENTION

Therefore, the object of the invention is to reinforce the security of the security modules as defined above, by ensuring the protection of the sensitive information, particularly during its transfer from an EEPROM to a RAM or vice versa, by encrypting it using a temporary protection key whose content varies at a given frequency, specifically a frequency that is a function of the degree of confidentiality of the sensitive information.

To this end, it relates to a process for storing sensitive information $ISj$ in a security module comprising data processing means and data storage means, characterized in that it includes the steps comprised of:

- having the sensitive information $ISj$ encrypted by the security module using a temporary encrypting protection key $CPi$ in a current version $CPi_{(ai+1)}$ supplied by the security module and an encryption algorithm stored with an associated decryption algorithm in said storage means;
- having the security module store, in a nonvolatile memory of the latter, the sensitive information in encrypted form $\overline{ISj}_{(ai+1)}$ associated with identifying data defining a temporary decrypting protection key $CPid$ in a current version $CPid_{(ai+1)}$ associated with said current version $CPi_{(ai+1)}$ of the temporary encrypting protection key $CPi$, said identifying data comprising a key identifier $CPid$ and an update subscript $(ai+1)$ which defines said current version $CPid_{(ai+1)}$ of the decrypting key from among several versions; and
- if the temporary decrypting protection key $CPid$ in its current version $CPid_{(ai+1)}$ is not already stored in said nonvolatile memory, having this version stored by the security module.

The invention also relates to a process for using sensitive information $ISj$ in a security module comprising data processing means and data storage means, which sensitive information $ISj$ is put into an encrypted form by the security module using a temporary encrypting protection key $CPi$ in a current version $CPi_{(ai+1)}$ supplied by the security module and an encryption algorithm stored with an associated decryption algorithm in said storage means, the sensitive information in encrypted form $\overline{ISj}_{(ai+1)}$ being stored in a nonvolatile memory of the security module in association with identifying data defining a temporary decrypting protection key $CPid$ in a current version $CPid_{(ai+1)}$ associated with said current version $CPi_{(ai+1)}$ of the temporary encrypting protection key $CPi$, said identifying data comprising a key identifier $CPid$ and an update subscript $(ai+1)$ which defines said current version $CPid_{(ai+1)}$ of the decrypting key from among several versions, characterized in that it includes the steps comprised of:

- having the security module, at each request to use the sensitive information $ISj$ issuing from inside or outside this module, select said current version $CPid_{(ai+1)}$ of the temporary decrypting protection key $CPid$ associated with this sensitive information, using said identifying data;
- having the security module decrypt the encrypted sensitive information $\overline{ISj}_{(ai+1)}$, using the current version $CPid_{(ai+1)}$ of the temporary decrypting protection key $CPid$ and the decryption algorithm, and temporarily storing the sensitive information $ISj$ in a decrypted form thus obtained, so that it disappears from the security module after a utilization of this sensitive information; and
- having the security module use the sensitive information $ISj$ in its decrypted form.

Lastly, the invention relates to a security module disposed to implement the above processes.

BRIEF DESCRIPTION OF THE DRAWINGS

Other details and advantages of the present invention will appear in the following description of a preferred but non-limiting embodiment, with reference to the appended drawings in which:

FIGS. 7 and 8 represent tables respectively corresponding to those of FIGS. 2 and 3, but including temporary protection keys or refreshed sensitive information.

DESCRIPTION OF THE PREFERRED EMBODIMENTS

Figures 1, 2:
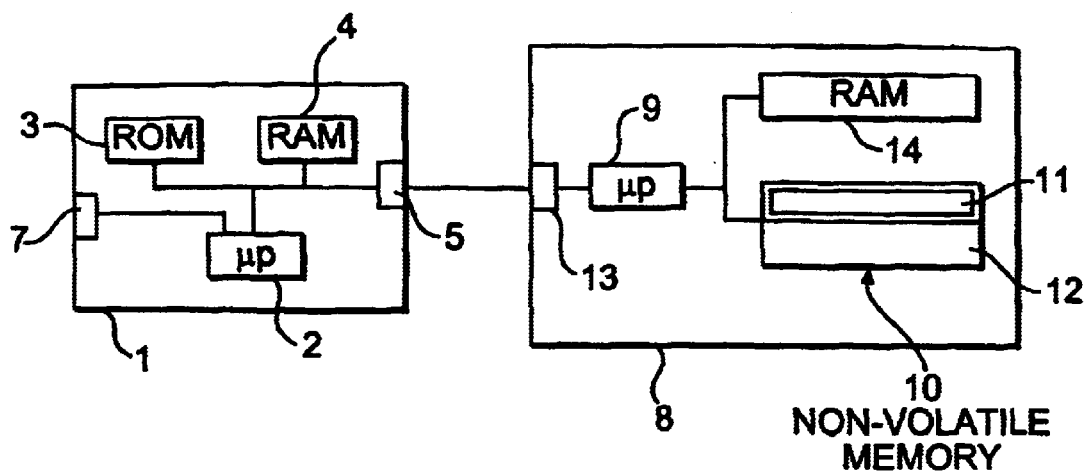
FIG. 1 is a diagram of a security module for which the invention is intended, which cooperates with a data processing device.
FIG. 2 is a table showing a set of temporary protection keys and their various attributes.

The data processing device 1 represented in FIG. 1 comprises, in a known way, a microprocessor 2 to which are connected a memory ROM 3 and a memory RAM 4, means 5 for cooperating, with or without physical contact, with a security module 8, and a transmission interface 7 enabling the data processing device to communicate with another similar device, either directly or through a communication network.

The device 1 can also be equipped with storage means such as diskettes or removable or non-removable disks, entry means (such as a keyboard and/or a pointing device such as a mouse) and display means, which various means are not represented in FIG. 1.

The data processing device can be constituted by any computing equipment installed at a private or public site, capable of providing means for managing information or providing various goods or services, which equipment may be permanently installed permanently or portable. It can also involve a telecommunications device.

In addition, the security module 8 includes data processing means 9, a nonvolatile memory 10, a volatile working memory RAM 14, and means 13 for cooperating with the data processing device. This module is disposed to define, in the memory 10, a secret area 11 in which information, once recorded, is inaccessible from outside the module but only accessible by the processing means 9, and a free area 12 which is accessible from outside the module for the reading and/or writing of information. Each area of the nonvolatile memory 10 can comprise a non-modifiable ROM part and a modifiable part constituted by an EPROM, EEPROM, or a RAM of the "flash" type, i.e. having the characteristics of an EEPROM plus access times identical to those of a conventional RAM.

As the security module 8, it is possible to use, in particular, a microprocessor with a self-programmable nonvolatile memory, as described in U.S. Pat. No. 4,382,279 in the name of the Applicant. As indicated in column 1, lines 13–25 of this patent, the self-programmable nature of the memory corresponds to the capability of a program fi located in this memory to change another program fj, also located in this memory, into a program gj. Although the means used to implement this self-programming can vary depending on the technology used to design the data processing means 9, it is noted that if these processing means are constituted by a microprocessor associated with a nonvolatile memory according to the above-mentioned patent, these means can include:

data and address buffer memories associated with the memory;

a program for writing into the memory, loaded into the latter and specifically containing the instructions that make it possible to maintain the programming voltage for the memory on the one hand, and the data to be written and their addresses on the other hand, for a sufficient length of time, which write program could, however, be replaced by a logic circuit write controller.

In a variant, the microprocessor of the security module 8 is replaced—or at least supplemented—by logic circuits installed on a semiconductor chip. In effect, such circuits are able to perform calculations, particularly for authentication and signature, using electronics that are hardwired, rather than microprogrammed. In particular, they can be of the ASIC (Application Specific Integrated Circuit) type, such as, for example, the SIEMENS component marketed under the reference number SLE 4436 and the SGS-THOMSON component marketed under the reference number ST 1335.

Advantageously, the security module 8 is designed in monolithic form on a single chip.

In a variant of the microprocessor with the self-programmable nonvolatile memory described above, the protected nature of the security module could result from its being located in a tamper-proof enclosure.

The invention uses several temporary encrypting protection keys $CP1, \ldots CPi, \ldots CPn$ and several associated temporary decrypting protection keys $CPd1, \ldots CPdi, \ldots CPdn$. Depending on the type of encryption algorithm used, the temporary decrypting protection keys may be identical to the temporary encrypting protection keys or different from them. Thus, a symmetrical secret key algorithm such as the DES (Data Encryption Standard) algorithm is typically used as the encryption algorithm, the secret key corresponding to one of the temporary encrypting protection keys $CP1, \ldots CPi, \ldots CPn$. For this type of algorithm, a decryption algorithm that is equal to the inverse of the encryption algorithm is used, and the secret key is used for both encryption and decryption. In other words, the decryption operation uses a decryption key that is identical to the encryption key.

In a less advantageous variant, an asymmetrical public key algorithm is used, such as the RSA algorithm (named for the inventors Rivest, Shamir and Adleman), which uses a public encryption key and another secret decryption key that is different from the encryption key. In this case, the security module stores these two keys, or parameters enabling them to be reconstructed, in two successive versions.

In the following description of the figures, a symmetrical secret key algorithm is used, so that the temporary decrypting protection keys $CPd1, \ldots CPdi, \ldots CPdn$ are the same as the temporary encrypting protection keys $CP1, \ldots CPi, \ldots CPn$; for this reason, the notations $CPd1, \ldots CPdi, \ldots Cpdn$ are not used and are replaced by $CP1, \ldots CPi, \ldots CPn$, then simply called "temporary protection keys" without specifying their encryption or decryption function.

The encryption algorithm can be identical to an algorithm used for various functions related to the applications for which the security module is intended, or can be specific and dedicated to the task of encrypting the temporary protection keys.

The table of FIG. 2 includes a first column defining a number n of temporary protection keys CP1, ... CPi, ... CPn respectively having a key number N1, ... Ni, ... Nn used to designate them. In order to prevent any untimely interruption in the operation of the security module, and as indicated below, for each temporary protection key, two successive values of the key are stored, each of which is marked by an update subscript related to this key and indicated by a1, ... ai, ... an. The value of this update subscript is an update rank. Thus, the key CPi has a current value $CPi_{(ai+1)}$ defined by an update subscript (ai+1), and a value $CPi_{ai}$ immediately preceding it in time, defined by an update subscript (ai). The various update subscripts change independently of one another.

Figures 3, 4:
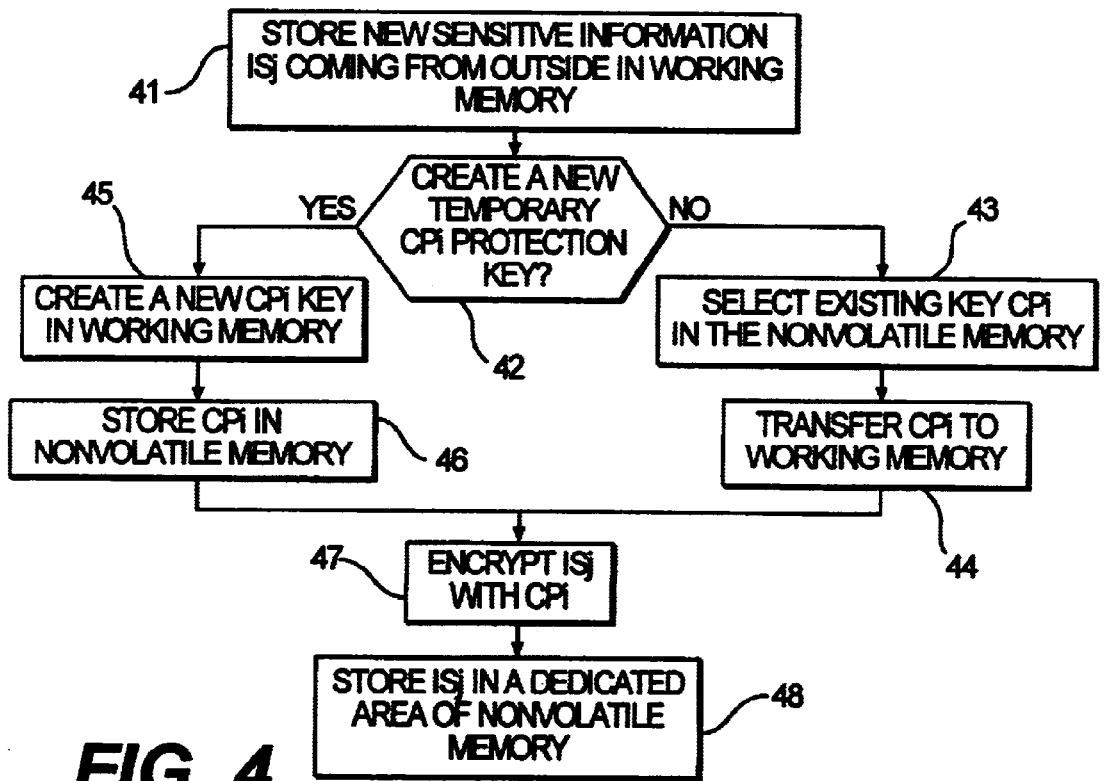
FIG. 3 is a table showing a set of sensitive information and the temporary protection keys respectively assigned to them.
FIG. 4 is a flowchart of a procedure for the initial encryption of any sensitive information ISj.

The table of FIG. 3 includes, in a first column, references to a number m of items of sensitive information IS1, IS2, ... IS(j−1), ISj, ... ISm, each of which is stored in the security module in encrypted form using an encryption algorithm and a temporary protection key chosen from among those in the table of FIG. 2. A second column in the table defines the number of the temporary protection key used for each item of sensitive information. Thus, the temporary protection key CP1 (whose number is N1) is used to protect the sensitive information IS1, IS2, the temporary protection key CPi is used for the sensitive information IS(j−1), ISj, and the temporary protection key CPn is used for the sensitive information ISm only. A third column of the table indicates the update subscript that the temporary protection key had when it was used to encrypt the sensitive information. Thus, the sensitive information IS1, IS2, ... Isj, ... ISm was encrypted with a key having the most recent update subscript (a1+1), (ai+1) or (an+1), as applicable, while the sensitive information IS(j−1) was encrypted with a key having an update index (ai) preceding the most recent update index (ai+1). Finally, a fourth column of the table indicates the stored version of the sensitive information. Thus, the sensitive information ISj is stored in the encrypted form $\overline{ISj}_{(ai+1)}$ which has the update subscript (ai+1) relative to the associated temporary protection key.

Typically, the data contained in the tables of FIGS. 2 and 3 are stored in the nonvolatile memory 10 of the security module, the values of the temporary protection keys such as $CPi_{ai}$ being stored in the secret area 11, while the other data can be stored either preferably in the secret area 11, or in the free area 12. As for the size of this data expressed in bits, the size of the keys, whether they are temporary protection keys CPi or keys constituting the sensitive information ISj, will typically be 64 bits, while that of the numbers Ni and update subscripts (ai) will typically be 1 byte. It will be noted that the first column in the table of FIG. 2 might not be stored in the security module, but its storage may nevertheless be useful for defining the type of information involved when wishing to store the temporary protection keys in an area containing information of another type.

Each temporary protection key such as CPi has a value that changes over time and is generated internally by the security module. According to a preferred embodiment, each key CPi is a random number of a function of a random number produced by the security module, so that its evolution over time is unpredictable. This random number can be generated by software, for example according to one of the processes described in U.S. Pat. Nos. 5,177,790 or 5,365,466, or by means of a circuit producing a random physical magnitude. In a less preferred embodiment, each key CPi is a data item that changes over time in accordance with a predetermined rule. For example, this data item is equal to the content of a counter which is regularly incremented by one unit. Depending on the situation, each temporary protection key CPi will be generated either in advance, or at the time it is used to encrypt an item of sensitive information ISj. In all cases, the creation of the temporary protection keys CPi as well as the encryption of decryption of the sensitive information ISj are entirely under the control of the security module, or in some cases under the control of a specially cleared authority cooperating with the security module, in the sense that only the security module or this authority can decide to perform these operations, which are transparent to the unauthorized outside world (i.e., any ordinary terminal or user cooperating with the security module), even if these operations can be triggered indirectly by a request from this unauthorized outside world, for example in order to use an item of sensitive information ISj in a cryptographic calculation such as the encryption or signature of a message, or the authentication of a message or a person.

The most frequent case is the one in which the security module cooperates with an unauthorized terminal and itself controls the creation of the temporary protection keys CPi as well as the encryption or decryption of the sensitive information ISj. A less frequent case is the one in which the security module cooperates with a terminal of the cleared authority, either before a first use of the security module in order to initialize it, or during its service life to enable the cleared authority to control the security module or to modify the functions or the data it contains; in the latter case, the creation of the temporary protection keys CPi as well as the encryption or decryption of the sensitive information ISj may possibly be under the control of this authority, and no longer under the control of the security module.

FIG. 4 is a flowchart of a procedure for the initial encryption of any sensitive information ISj, before it is stored in the nonvolatile memory 10 of the security module. A typical example is the case where this procedure is triggered from outside the security module, by an authority wishing to store the sensitive information ISj in this module. In a first step 41, the security module stores in working memory 14 the new sensitive information ISj received from outside, while in a second step 42, the security module—or possibly the cleared authority—decides whether a new temporary protection key CPi rather than an existing key will be used to encrypt the sensitive information ISj. If not, the processing means 9 of the security module selects (step 43) an existing temporary protection key in the nonvolatile memory 10 and transfers it (step 44) into the volatile working memory 14. In the example of FIG. 3, this is the key CPi having the number Ni. For the key value, the security module chooses the one that has the highest update subscript: in this case, it is the subscript (ai+1), but if this key had never been updated, it would be the subscript 1. Conversely, if it is decided in step 42 that a new temporary protection key must be created, this creation by the security module is carried out in step 45 in the working memory 14, and the key is saved (step 46) in nonvolatile memory for later use.

In step 47, the security module encrypts the information ISj with the key CPi to obtain a result $\overline{ISj}_{(ai-1)}$. In step 48, the security module stores this result in an area of nonvolatile memory dedicated to this sensitive information. Naturally, in association with the sensitive information $\overline{ISj}_{(ai+1)}$, and as illustrated in FIG. 3, the security module stores the number Ni and the update index (ai+1) of the key used.

Figure 5:
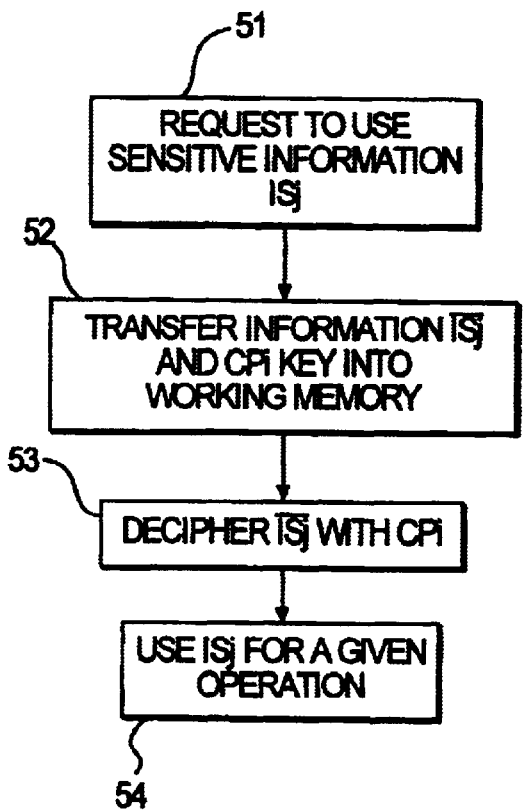
FIG. 5 is a flowchart of a procedure for decrypting the sensitive information $\overline{ISj}$, with a view to its utilization in an operation.

FIG. 5 is a flowchart of a procedure for decrypting the sensitive information $\overline{ISj}$, with a view to its utilization in an operation, typically an operation inside the security module.

In step 51, a request to use an item of sensitive information $IS_j$ is formulated, for example on the initiative of the data processing device 1, so that in step 52, the security module transfers the sensitive information in its encrypted form $\overline{IS_j}_{(ai+1)}$ and the corresponding temporary protection key $CP_i$ (in the applicable version ai+1) from its nonvolatile memory 10 to its working memory 14. There, it then decrypts (step 53) the sensitive information with the key to obtain the decrypted sensitive information $IS_j$. In step 54, the security module uses the decrypted sensitive information $IS_j$ in the operation to be executed. It will be noted that after its use in the operation to be executed, the decrypted sensitive information $IS_j$ will disappear so that it does not reside permanently in the security module. In this example, this is obtained as a result of a property of nonvolatile memory whereby the information it contains disappears when it is powered down, which occurs at the end of the communication with the data processing device 1.

Figure 6:
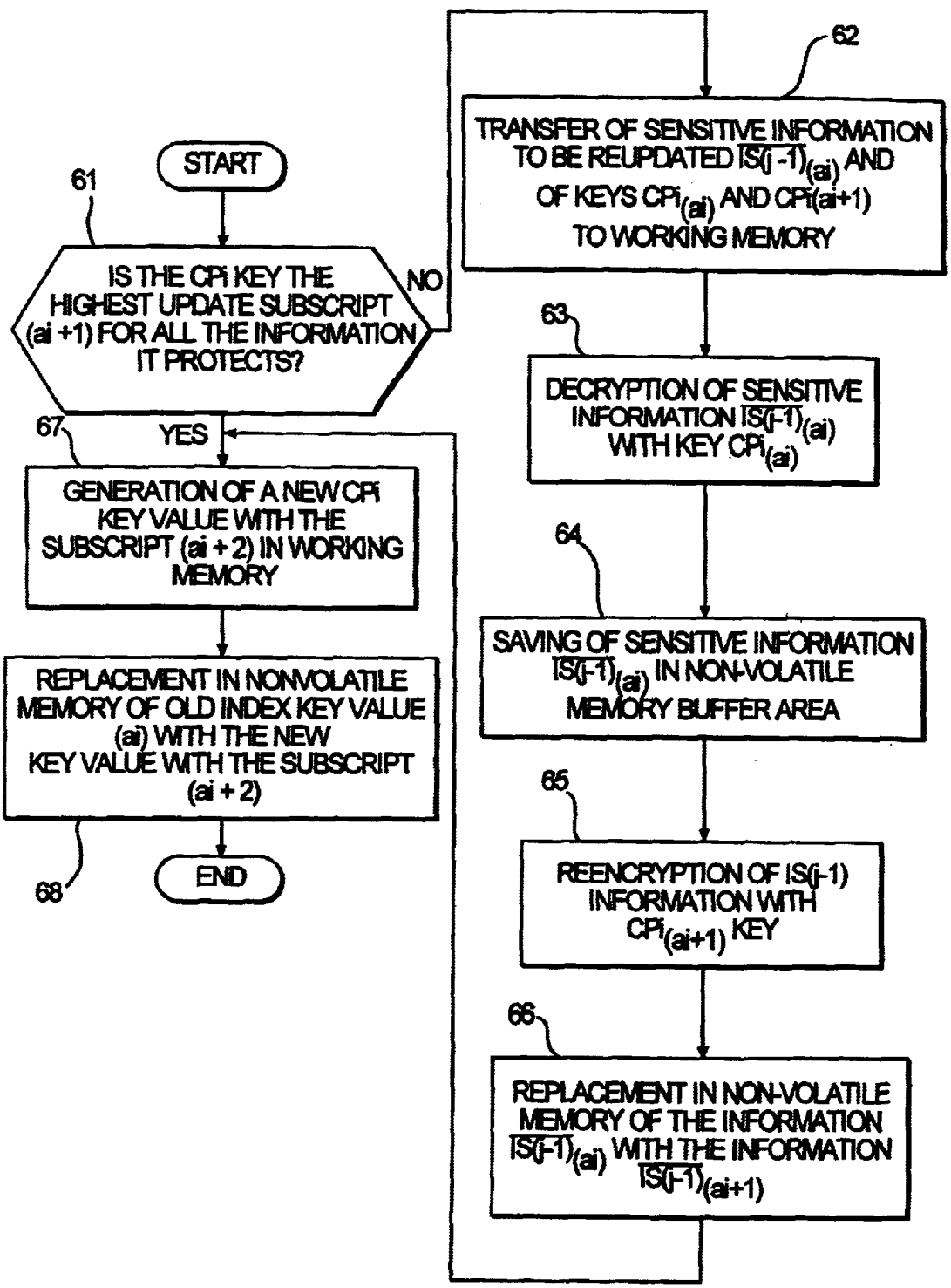
FIG. 6 is a flowchart of a procedure for periodically refreshing any temporary protection key CPi.

FIG. 6 is a flowchart of a procedure for periodically refreshing (i.e., renewing) any temporary protection key $CP_i$. Its particular advantage is that it produces a variation in the content of this key, making it difficult to succeed at any fraudulent attempt to figure out this key; moreover, this refreshed key makes it possible, through a new encryption of the associated sensitive information, to refresh the encrypted form of this information, making it even more difficult to figure out the content of the sensitive information from its encrypted form. In effect, it is known that a defrauder can gain an advantage by observing the electrical signals present in the terminals of the security module, particularly during the data transfers between the nonvolatile memory and the working memory 14, which signals are practically always affected by the nature of the operations carried out by the security module. If the defrauder were to store a substantial number of such observations and perform a statistical analysis, he could potentially succeed in reconstituting the sensitive information in question.

The procedure of FIG. 6 is triggered either on the initiative of the security module, which is disposed to refresh its temporary protection keys at a predetermined or even random rate, or on the initiative of the data processing device 1 which, for this purpose, sends the security module an appropriate message or command, although in the latter case, the execution per se of the procedure remains under the sole control of the security module, except possibly in the specific case where the data processing device 1 is that of the cleared authority. The refreshing is carried out at a rate that is preferably a function of the type of sensitive information involved; thus, this rate will be increased for an item of sensitive information such as a confidential user code or PIN (personal identification number) which, given the small number of digits it normally contains and its frequent use, is more subject to fraud than a cryptographic encryption or signature key. The security module will advantageously store, in its nonvolatile memory 10, indications of the refresh rate to be applied to each item of sensitive information. For example, refreshing could be provided each time the sensitive information in question is used a predetermined number of times.

In a first step 61, the security module consults its table of FIG. 2 to determine whether the temporary protection key $CP_i$ that it must refresh has the highest update subscript for all of the sensitive information it is protecting. In fact, given that it is preferable to retain only two successive versions for each key, the refreshing of one key presupposes the deletion of the older version so that the most recent version can be written in its place. However, this deletion can only take place if no currently stored sensitive information needs to be decrypted using the older version; otherwise this decryption will be impossible.

If the condition established in step 61 is not fulfilled, the security module will then update the encrypted form of the sensitive information in question. First, in step 62, it transfers this sensitive information (in this example, only the sensitive information $\overline{IS(j-1)}_{ai}$), into the working memory 14, along with the corresponding value $CPi_{ai}$ of the temporary protection key $CP_i$, and the most recent value $CPi_{(ai+1)}$ of this same key. In step 63, it decrypts the sensitive information $\overline{IS(j-1)}_{ai}$ with the key $CPi_a$, then in step 64 it saves the sensitive information $\overline{IS(j-1)}_{ai}$ (i.e., in its encrypted form) in a buffer area of the nonvolatile memory 10, in order to avoid losing it in the event that the subsequent re-encryption of IS(j-1) is interrupted. In step 65, the security module re-encrypts the restored sensitive information (IS(j-1) with the most recent value $CPi_{(ai+1)}$ of the temporary protection key $CP_i$ to obtain the most recent version $\overline{IS(j-1)}_{(ai+1)}$ of the encrypted form of the sensitive information IS(j-1). Finally, in step 66, the security module replaces the oldest value $\overline{IS(j-1)}_{ai}$ in the nonvolatile memory 10, with the most recent value $\overline{IS(j-1)}_{(ai+1)}$ and it updates the update subscript (ai) by incrementing it by one unit to obtain (ai+1); this situation is illustrated in bold characters in FIG. 8, in the third and fourth columns of the table.

After this step, or if the condition of step 61 has already been fulfilled, the security module, in step 67, generates a new value $CPi_{(ai+2)}$ of the temporary protection key $CP_i$ with a new update subscript (ai+2) in the working memory 14. As indicated previously, according to a preferred embodiment, this new value is a random number or a function of a random number. Finally, in step 68, the security module replaces, in its table of FIG. 2 located in nonvolatile memory 10, the oldest value $CPi_{ai}$ of the temporary protection key $CP_i$ with the most recent one $CPi_{(ai+2)}$ and it updates the update index (ai) by incrementing it by two units to obtain (ai+2): this situation is illustrated in bold characters in FIG. 7, in the third and fourth columns of the table.

Figure 9:
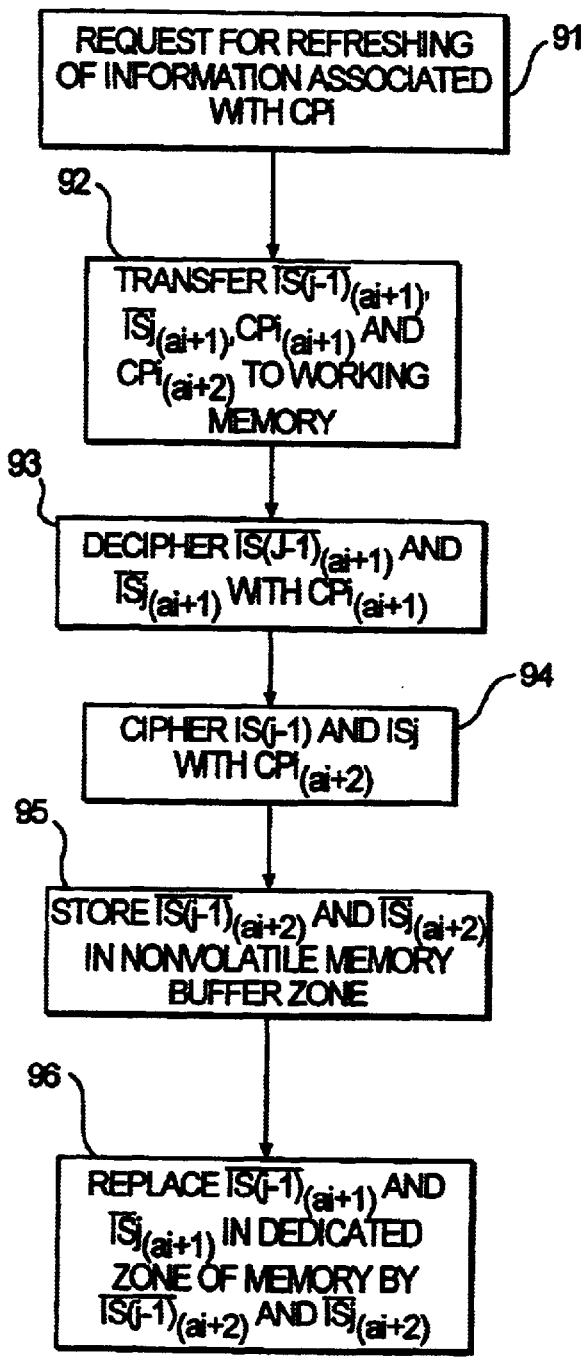
FIG. 9 is a flowchart of a procedure for periodically refreshing any sensitive information.

FIG. 9 is a flowchart of a procedure for periodically refreshing any item of sensitive information. Typically, this procedure will follow the key refresh procedure of FIG. 6 and will involve precisely the sensitive information associated with the keys thus refreshed; however, in a variant, it could be executed at any later time. Like the procedure of FIG. 6, it is triggered either on the initiative of the security module, which is disposed to refresh its sensitive information at a predetermined or random rate, or on the initiative of the data processing device 1 which, for this purpose, sends an appropriate command or message to the security module, although in the latter case, the execution per se of the procedure remains under the sole control of the security module, except possibly in the specific case where the data processing device 1 is that of the cleared authority.

Hence, in step 91, a request to refresh sensitive information is therefore formulated. In step 92, the security module transfers the sensitive information in question and their associated temporary protection keys into working memory 14; in this example, this involves the sensitive information $\overline{IS(j-1)}_{(ai+1)}$ and $\overline{IS_j}_{(ai+1)}$, and the keys $CPi_{(ai+1)}$ and $CPi_{(ai+2)}$. In step 93, the security module decrypts this sensitive information with the key $CPi_{(ai+1)}$, then in step 94, it re-encrypts the sensitive information IS(j-1) and $IS_j$ thus obtained with the key $CPi_{(ai+2)}$. In step 95, it stores the re-encrypted sensitive information $\overline{IS(j-1)}_{(ai+2)}$ and $\overline{IS_j}_{(ai+2)}$ in the above-mentioned buffer area of the nonvolatile memory. Finally, in step 96, it stores this data in the dedicated area of the nonvolatile memory, in place of the sensitive information $\overline{IS(j-1)}_{(ai+1)}$ and $\overline{ISj}_{(ai+1)}$, and it updates the update subscript (ai+1) by incrementing it by one unit to obtain (ai+2); this situation is illustrated in bold characters in FIG. 8, in the fifth and sixth columns of the table.

In the various procedures described above, the series of steps may be temporarily interrupted by the data processing means 9 of the security module in order to execute other tasks independent of the process of the invention but deemed to have priority at a given time. In this case, the procedure will be resumed at the end of the execution of these tasks. Furthermore, the order in which the security module processes the temporary protection keys and the sensitive information can change according to different variants. For example, the procedure of FIG. 6 performs a complete refreshing of the key CPi, independently from that of the other keys; in a variant, the security module performs a simultaneous refreshing of several keys, in which case the steps of FIG. 6 specific to each key are juxtaposed or interleaved with those specific to the other keys.

As for the method of making the decrypted sensitive information disappear after its utilization in a given operation, the above example uses the property of information loss in a volatile memory (in this case, the working memory 14) when it is powered down at the end of the communication with the data processing device 1. In a variant, if the memory used for the temporary storage of the sensitive information were nonvolatile, it would be necessary to trigger a deletion of this information from the memory, using a specific command executed by the microprocessor 9 of the security module. The expression "temporarily storing the decrypted sensitive information so that it disappears from the security module after utilization," used at certain points in the present text, is specifically intended to cover these two forms of execution.

In the case of the variant of the invention mentioned above and using an asymmetrical public key algorithm, an algorithm of this type typically receives data in a 512-bit format, i.e., one that is substantially larger than the typical format of sensitive information (64 bits). Advantageously, a grouping or concatenation of several items of sensitive information is therefore performed in order to obtain an overall 512-bit format before their common encryption using said algorithm.

In the example described above, the security module 8 typically functions in a mode wherein it is linked to a data processing device 1. In a variant, the security module has means for supplying itself with electric power and it implements the above-described process for storing or using sensitive information—or at least certain steps of this process—in a mode that is autonomous, i.e., not linked to a data processing device.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for storing an item of sensitive information ISj in a security module, said security module including means for storing data, said process comprising the steps of:
   encrypting the item of sensitive information ISj using a current version $CPi_{(ai+1)}$ of a temporary encrypting protection key CPi, wherein said current version $CPi_{(ai+1)}$ is supplied by the security module, and an encryption algorithm, wherein said encryption algorithm is stored with an associated decryption algorithm in said means for storing data, said associated decryption algorithm being able to decrypt said item of sensitive information ISj from said item of sensitive information in encrypted form $\overline{ISj}_{(ai+1)}$;
   storing in a nonvolatile memory of the security module the item of sensitive information in encrypted form $\overline{ISJ}_{(ai+1)}$ associated with identifying data defining a current version $CPid_{(ai+1)}$ of a temporary decrypting protection key CPid associated with said current version $CPi_{(ai+1)}$ of the temporary encrypting protection key CPi, said identifying data comprising a key identifier CPid and an update subscript (ai+1) which defines said current version $CPid_{(ai+1)}$ of the decrypting protection key from among a plurality of versions, said associated decrypting protection key CPid used by said associated decryption algorithm to decrypt said item of sensitive information ISj from said item of sensitive information in encrypted form $\overline{ISJ}_{(ai+1)}$; and
   in a case where the current version $CPid_{(ai+1)}$ of temporary decrypting protection key CPid is not already stored in said nonvolatile memory, storing said current version by said security module.

2. The storage process according to claim 1, further comprising supplying successive different versions of a random number from the security module, each version of the temporary encrypting protection key CPi supplied by the security module being created by using a different version of said random number.

3. The process according to claim 1, wherein said temporary encrypting protection key is generated by the security module.

4. The process according to claim 1, wherein said security module is designed in monolithic form on a single chip.

5. A process for using an item of sensitive information ISj in a security module, said security module including means for processing data and means for storing data, said process comprising the steps of:
   storing said item of sensitive information ISj in an encrypted form $\overline{ISJ}_{(ai+1)}$ by the security module, wherein said item of sensitive information ISj is encrypted using a current version $CPi_{(ai+1)}$ of temporary encrypting protection key CPi, wherein said current version $CPi_{(ai+1)}$ is supplied by the security module, and an encryption algorithm, wherein said encryption algorithm is stored with an associated decryption algorithm in said means for storing data; said associated decryption algorithm being able to decrypt said item of sensitive information ISj from said item of sensitive information in encrypted form $\overline{ISJ}_{(ai+1)}$, the item of sensitive information in encrypted form $\overline{ISJ}_{(ai+1)}$ being stored in a nonvolatile memory of the security module, in association with identifying data defining a current version $CPid_{(ai+1)}$ of a temporary decrypting protection key CPid associated with said current version $CPi_{(ai+1)}$ of the temporary encrypting protection key CPi, said identifying data comprising a key identifier CPid and an update subscript (ai+1) which defines said current version $CPid_{(ai+1)}$ of the decrypting protection key from among a plurality of versions, said associated decrypting protection key CPid used by said associated decryption algorithm to decrypt said item of sensitive information ISj from said item of sensitive information in encrypted form $\overline{ISJ}_{(i+1)}$; and selecting by the security module, upon a request to use the item of sensitive information ISj issuing from inside or outside the module, said current version $CPid_{(ai+1)}$ of the temporary decrypting protection key CPid associated with the item of sensitive information using said identifying data;

decrypting by the security module the encrypted item of sensitive information $\overline{ISJ}_{(ai+1)}$ using the current version $CPid_{(ai+1)}$ of the temporary decrypting protection key CPid and the decryption algorithm, and temporarily storing the item of sensitive information ISj in a decrypted form so that it disappears from the security module after a utilization of the item of sensitive information; and using the item of sensitive information ISj by the security module in its decrypted form.

6. The process according to claim 5, further comprising periodically modifying the encrypted form of an item of sensitive information by the steps of:

decrypting the item of sensitive information stored in a current encrypted form $\overline{ISJ}_{(ai+1)}$ by the security module, using the current version $CPid_{(ai+1)}$ of the temporary decrypting protection key CPid associated with it and said associated decryption algorithm;

selecting a new version $CPi_{(ai+2)}$ of the temporary encrypting protection key CPi by the security module;

re-encrypting the decrypted item of sensitive information ISj by the security module using the new version $CPi_{(ai+2)}$ of the temporary encrypting protection key and said encryption algorithm to produce a new encrypted form $\overline{ISJ}_{(ai+2)}$ of the item of sensitive information; and storing, in the security module, the item of sensitive information in its new encrypted form $\overline{ISJ}_{(ai+2)}$ and a new version $CPid_{(ai+2)}$ of the temporary decrypting protection key CPid associated with said new version $CPi_{(ai+2)}$ of the temporary encrypting protection key CPi.

7. The process according to claim 6, further comprising supplying successive different versions of a random number by a random number generating means the security module, each current version $CPi_{(ai+1)}$ and new version $CPi_{(ai+)2}$ of the temporary encrypting protection key CPi supplied by the security module being obtained from a different version of said random number.

8. The utilization process according to claim 6, further comprising storing two most recent versions of each temporary decrypting protection key CPid, a next-to-last version $CPid_{ai}$ and a last version $CPid_{(ai+1)}$, in the nonvolatile memory (10) of the security module, and when a new version $CPi_{(ai+2)}$ of any a temporary encrypting protection key is produced by the security module, storing a corresponding new version $CPid_{(ai+2)}$ of the associated temporary decrypting protection key CPid by the module in the nonvolatile memory, in place of the next-to-last version $CPid_{ai}$.

9. The process according to claim 8, in which several items of sensitive information IS(j−1), ISj are respectively encrypted with a different next-to-last version $CPi_{ai}$ and a different last version $CPi_{(ai+1)}$ of a same temporary encrypting protection key CPi so as to produce encrypted forms $\overline{IS(J-1)}_{ai}$ and $\overline{ISJ}_{(ai+1)}$, and when a new version of these items of sensitive information are to be produced by the security module, the following steps are executed:

decrypting the item of sensitive information $\overline{IS(J-1)}_{(ai)}$ encrypted with the next-to-last version $CPi_{ai}$ of the temporary encrypting protection key CPi by the security module, using the next-to-last version $CPid_{ai}$ of the temporary decrypting protection key CPid associated with the protection key;

re-encrypting the decrypted item of sensitive information IS(j−1) by the security module using said last version $CPi_{(ai+1)}$ of the temporary encrypting protection key to produce a new encrypted form $\overline{IS(J-1)}_{(ai+1)}$ of the item of sensitive information; and storing, in the security module, the item of sensitive information in its new encrypted form $\overline{IS(J-1)(J-1)}_{(ai+1)}$; and, in order to produce said new version of the items of sensitive information IS(j−1), ISj, executing the following steps:

decrypting all the items of sensitive information $\overline{IS(J-1)}_{(ai+1)}$ and $\overline{ISJ}_{(ai+1)}$ related to said temporary encrypting protection key CPi by the security module using a last version $CPid_{(ai+1)}$ of the temporary decrypting protection key CPid associated with said last version $CPi_{(ai+1)}$ of the temporary encrypting protection key CPi;

re-encrypting the decrypted items of sensitive information IS(j−1), ISj by the security module, using a new version $CPi_{(ai+2)}$ of the temporary encrypting protection key and said encryption algorithm, in order to produce a new encrypted form $\overline{IS(J-1)}_{(ai+2)}$ and $\overline{ISJ}_{(ai+2)}$ of these items of sensitive information; and storing, in the security module, the items of sensitive information in new encrypted forms $\overline{IS(J-1)}_{(ai+2)}$ and $\overline{ISJ}_{(ai+2)}$ and a new version $CPid_{(ai+2)}$ of the temporary decrypting production key CPid associated with said new version $CPi_{(ai+2)}$ of the temporary encrypting protection key.

10. The process according to claim 5, wherein said security module is designed in monolithic form on a single chip.

11. A security module comprising:

means for processing data;

means for storing data:

key producing means disposed to produce one or more temporary encrypting protection keys CP1, . . . CPi, . . . CPn and an equal number of associated temporary decrypting protection keys CP1d, . . . CPid, . . . CPnd, and for each temporary encrypting protection key CPi and decrypting protection key CPid, several successive versions $CPi_{ai}$, $CPi_{(ai+1)}$, $CPi_{(ai+2)}$ and $CPid_{ai}$, $CPid_{(ai+1)}$, $CPid_{(ai+2)}$;

means for associating with a given item of sensitive information ISj a predetermined temporary encrypting protection key CPi and temporary decrypting protection key CPid also associated with the temporary encrypting protection key CPi;

encryption means for carrying out successive encryptions of the item of sensitive information ISj using one or another of said successive versions $CPi_{ai}$, $CPi_{(ai+1)}$, $CPi_{(ai+2)}$ of the temporary encrypting protection key associated with the item of sensitive information, wherein said encryption means includes an encryption algorithm stored in the storage means; and decryption means for carrying out successive decryptions of the item of sensitive information ISj using, for each decryption, from among said successive versions $CPid_{ai}$, $CPid_{(ai+1)}$, $CPid_{(ai+2)}$ of the temporary decrypting protection key, a version associated with the version of the temporary encrypting protection key used in the corresponding encryption, wherein said decryption means includes an associated decryption algorithm stored in the storage means, said associated decryption algorithm being able to decrypt said item of sensitive information ISj from the information encrypted by said encryption algorithm using said version of the temporary decrypting protection key.

12. The security module according to claim 11, comprising a random number generator means for supplying successive different versions of a random number, each of said successive versions $CPi_{ai}$, $CPi_{(ai+1)}$, $CPi_{(ai+2)}$ of each temporary encrypting protection key CPi supplied by the security module being obtained from a different version of said random number.

13. The security module according to claim 11, wherein said security module is designed in monolithic form on a single chip.

* * * * *

UNITED STATES PATENT AND TRADEMARK OFFICE
CERTIFICATE OF CORRECTION

PATENT NO. : 6,658,566 B1
DATED : December 2, 2003
INVENTOR(S) : Michel Hazard

It is certified that error appears in the above-identified patent and that said Letters Patent is hereby corrected as shown below:

Column 11,
Line 52, "of any a temporary" should be -- of a temporary --

Column 12,
Line 12, "IS(J-1)(J-1)" should be -- IS(J-1) --

Signed and Sealed this

Thirty-first Day of August, 2004

JON W. DUDAS
*Director of the United States Patent and Trademark Office*